Jan. 15, 1924.
C. E. DRESSLER
1,481,084
BLOOD PRESSURE RECORDER
Filed Dec. 24, 1921  2 Sheets-Sheet 2
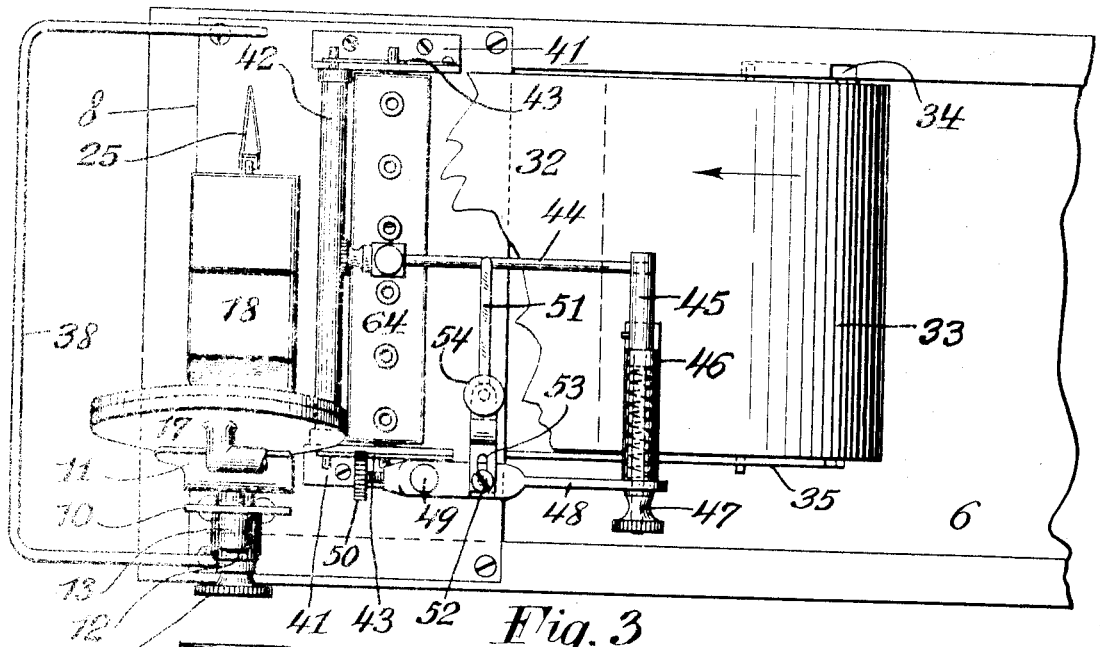
Fig. 3
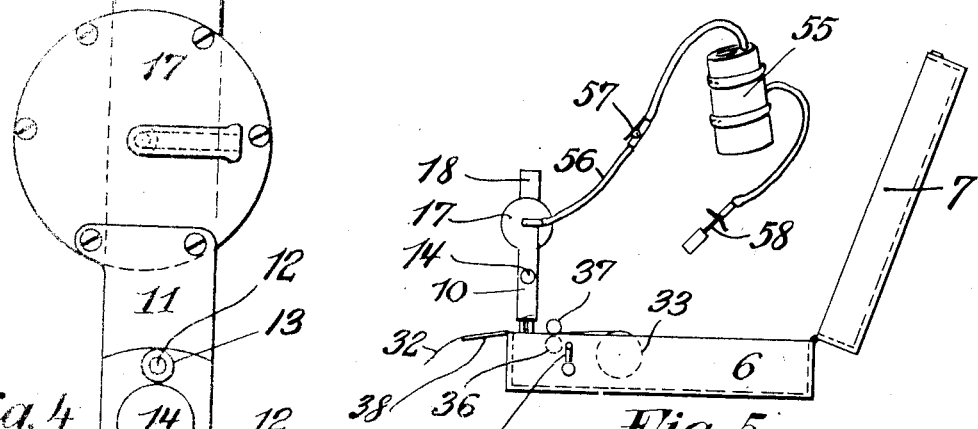
Fig. 4  Fig. 5
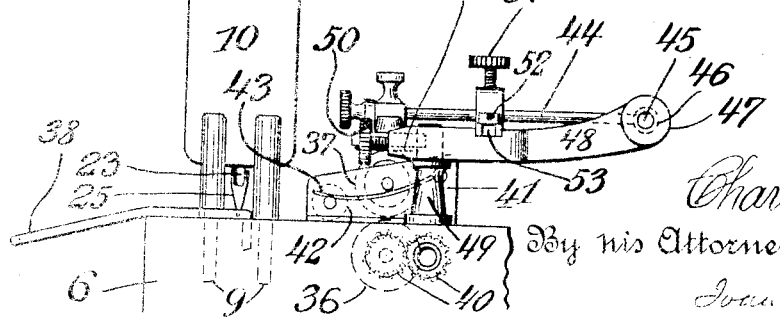
Inventor
Charles E. Dressler
By his Attorney
Ivan E. A. Konigsberg Patented Jan. 15, 1924.

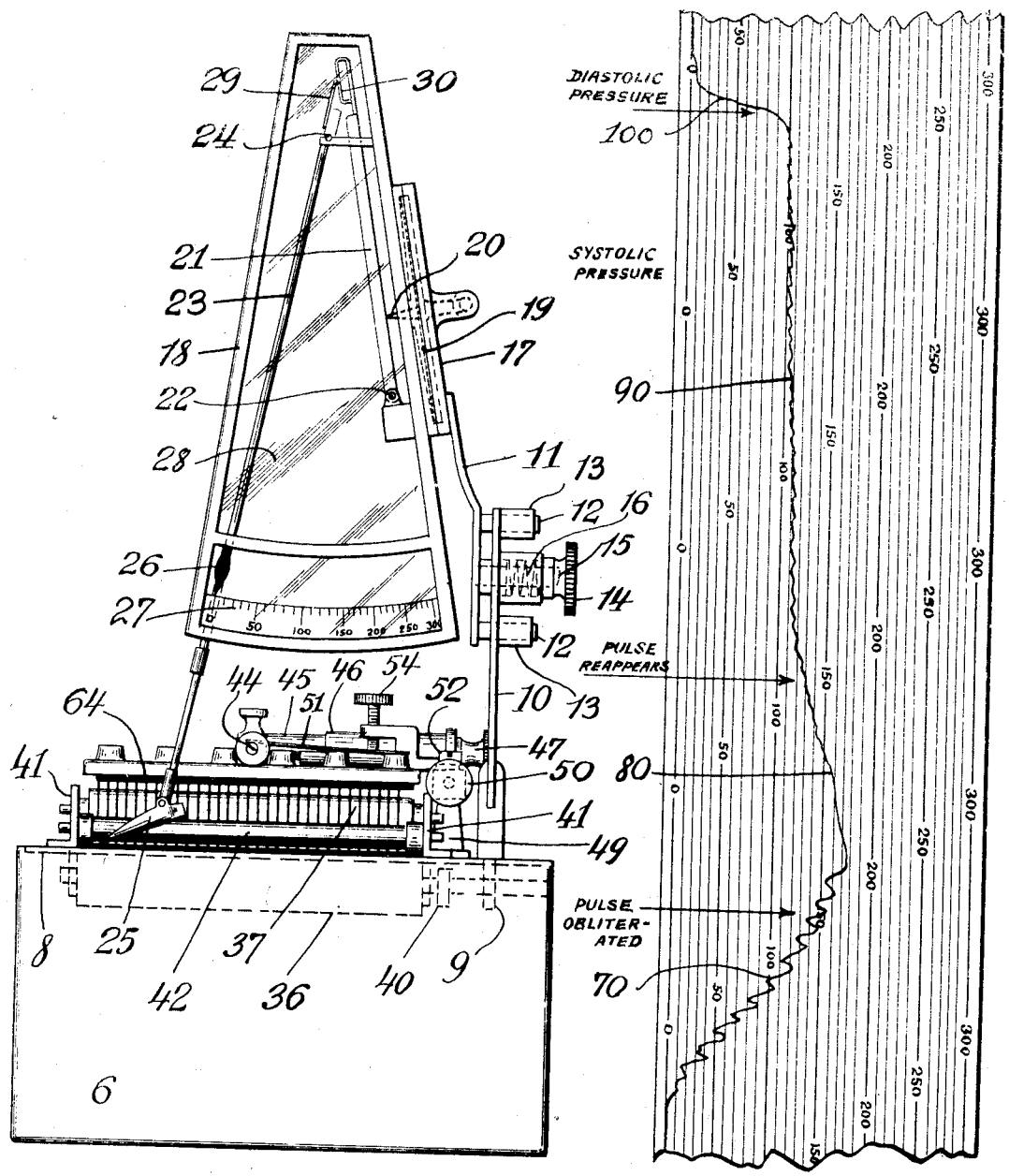

1,481,084

UNITED STATES PATENT OFFICE.

CHARLES E. DRESSLER, OF NEW YORK, N. Y.

BLOOD-PRESSURE RECORDER.

Application filed December 24, 1921. Serial No. 524,567.

*To all whom it may concern:*

Be it known that I, CHARLES E. DRESSLER, a citizen of the United States, and resident of New York city, in the county of New York and State of New York, have invented certain new and useful Improvements in Blood-Pressure Recorders, of which the following is a specification.

This invention relates to blood pressure recording instruments. The object of the invention is to provide a small compact, easily operated, portable apparatus containing a simply constructed, yet accurate and effective mechanism for graphically recording the blood pressure of a patient for the physician's use.

Accordingly my invention is embodied in a blood pressure recorder constructed and arranged as hereinafter set forth and as illustrated in the accompanying drawings in which—

Figure 1 is a view of a strip of paper showing a record obtained by the use of the blood pressure recorder.

Figure 2 is a front view of the apparatus set up ready for use with parts omitted.

Figure 3 is a plan view of the apparatus shown in Figure 2 with parts broken away.

Figure 4 is a side view of the main portions of the apparatus looking towards the left in Figure 2.

Figure 5 is a small outline view of the entire apparatus.

Referring to Figures 2 to 5 the apparatus is contained within a suitable wooden case 6 provided with a hinged cover 7. The casing is large enough to contain all the parts required to obtain a record, and so balanced that when the apparatus is in use, the casing may stand with its cover open as in Figure 5.

The forward end of the casing 6—to the left in Figure 3—is covered with a metal plate 8 forming a base provided with openings for receiving the pegs or feet 9, 9 of an upright support 10. To the latter is adjustably secured a bracket 11, which has two pins 12, 12 slidably carried in bosses 13, 13 on the upright 10 for the purpose of lateral alinement between the two members 10 and 11. Adjustment is effected by turning the knurled nut 14 whereby the stem 15 in the bracket 11 is moved towards or away from the upright 10 as will be understood. A spring 16 provides the required tension between the nut 14 and the stem 15.

The bracket 11 carries a diaphragm casing 17 secured to a recorder casing 18. The diaphragm casing contains a suitable diaphragm 19 provided with a button 20 which acts against a lever 21 pivoted within the casing 18 at 22.

The lever 21 rests by gravity against a pen arm 23 pivoted at 24. The arm projects downwardly through the casing outside of which it carries a recording pen 25. Inside the casing the arm 23 carries an indicating pointer 26 adapted to move over and indicate on a scale 27 of blood pressure from zero to 300 m. m. Hg.

The recorder casing 18 has an open front covered with a glass 28. The arrangement with respect to the lever 21 and pen arm 23 is for purposes of compounding the diaphragm movements as is obvious, and in order to reduce disturbing friction between the two elements, wire loops 29 and 30 form the points of contact between them as shown.

It follows from the foregoing that operation of the nut 14 causes lateral adjustment of the pen 25.

The recording pen 25 has a reservoir for ink and is adapted to trace a record on the paper 32 from the paper supply roll 33 suitably mounted to rotate in the casing as for instance by providing the latter with a cut out portion 34 and a bearing 35. The paper roll is journaled in said cut out 34 and in the bearing.

The paper passes from the roll 33 between a feed roller 36 and a printing roller 37 and forwardly over a convenient loosely secured bracket 38. The feed roller is operated by a handle 39, see Figure 5, through suitable gearing 40, Figure 4. The printing roller is journaled in brackets 41, 41 and forwardly of said printing roller a tension roller 42 may be provided. A spring 43 on each side secured to the brackets 41 keeps the roller 42 under proper tension.

The printing roller is graduated to print a scale calibrated in comparison with a standard scale of blood pressure from zero to 300 m. m. Hg. which is printed on the paper as it unrolls from the paper roll.

Ink is supplied to the printing roller from an ink pad 64 carried by a rod 44, see Figure 3, which in turn is adjustably mounted in a stem 45 held in a sleeve 46, in which said stem is adjusted by a nut 47.

The sleeve 46 is carried by an arm 48 secured to a post 49 by a screw 50. Tension is put upon the rod 44 by a spring 51 adjustably carried by the arm 48. The position of the spring may be adjusted by screw 52 and slot 53, and the tension may be adjusted by the screw 54.

The diaphragm casing 17 communicates with the usual armlet or cuff 55 by a rubber hose 56 provided with an air valve 57, see Figure 5. The armlet is inflated by an inflator 58.

The foregoing describes the apparatus itself. It will be noted that it is very compact and that simple and easily reached and operated adjusting means have been provided. When in use, the apparatus is set up as shown in the drawings. The physician is then able to adjust the pen accurately to swing clear across the paper, and the proper tension on the ink pad for clean inking of the printing roller is also easily obtained. The several adjustments and general inspection of the apparatus may all be done at the front. When not in use the upright 10 is lifted up away from the plate 8 and said upright with parts carried thereby may then be laid into the casing together with the armlet and rubber hose and the case closed and carried about. During operation the physician turns the crank 39 with the right hand, or a spring or other motor might be used for this purpose, and with his left hand he feels the pulse of the patient. The record made on the paper unrolls then in front of the physician towards him, so that it may be easily read and diagnosed.

The use of the blood pressure recorder is as follows: The armlet or cuff having been secured to the patient's arm is inflated in the usual manner until the pulse is obliterated. As that point is not precisely known, the inflation of the armlet is continued a moment or so after the pulse has been obliterated, which of course the physician can feel with his left hand.

During the inflation the pen traces a record about as shown in Figure 1 at 70. When the pulse has been completely obliterated, the valve 57 is opened slightly to permit the air to escape from the armlet. During this period the pen tracings are of the character shown at 80. The point marked "pulse reappears" may be observed from the movement of the pen which then begins to waver and operate in response to the pulsations of the pulse, and continues to do so as the air is let out of the armlet.

The record thus made is that of the systolic or high pressure and is marked 90 in Figure 1. Finally when all the air has passed out of the armlet, the pen traces the record as at 100 showing the diastolic or low pressure record from which the pen passes to zero.

In this manner the physician has obtained a graphic record of the patient's pulse for using and may at the same time observe the movements of the arrow 26 over the scale 27. The speed at which the paper is run off depends upon the case and is within the control of the physician.

The scale printed by the printing roller is repeated for each rotation so as to be easily readable and available all the time, said roller printing of course both the numerals as well as the gradation lines. The operation may be repeated and thus the record checked.

The foregoing is thought to clearly set forth the construction, operation, use and advantages of this apparatus. To the best of my knowledge the invention disclosed is broadly new in that heretofore no apparatus existed for making a graphic permanent record of the blood pressure.

I do not wish to be limited to the exact disclosure herein, as modifications may easily suggest themselves to those skilled in the art, and the invention is susceptible of such alterations as come within the legitimate and proper scope of the appended claim.

I claim:—

The combination of blood pressure reproducing means, a strip of paper, a pen, means for operating said pen to trace the operations of said reproducing means on the said paper, a vertically disposed casing for supporting and enclosing the said pressure reproducing means, the said pen and the operating means therefor, a visible scale carried by said casing, means for observing the operations of the said pen on said scale, a box, means in said box for printing a standard blood pressure scale on said paper in advance of the tracings of the pen, means in said box for feeding said paper at right angles to the movement of the pen, and means on said box and said casing for operatively and detachably connecting the same together.

CHARLES E. DRESSLER.